United States Patent Office 3,539,664
Patented Nov. 10, 1970

3,539,664
HOMOGENEOUS NYLON GRAFT COPOLYMERS ONTO ETHYLENE COPOLYMER BACKBONES
Raymond Joseph Kray, Berkeley Heights, and Allen Foster Higbee, Cedar Knolls, N.J., assignors to Allied Chemical Corporation, New York, N.Y., a corporation of New York
No Drawing. Filed Feb. 14, 1968, Ser. No. 705,274
Int. Cl. C08g 41/04
U.S. Cl. 260—857                                    15 Claims

ABSTRACT OF THE DISCLOSURE

This specification discloses homogeneous graft polymers of a lactam and an olefin copolymer, the copolymer derived from an olefin and from 5% to 30% by weight of an unsaturated heterocyclic compound containing an oxygen or nitrogen atom in the ring, the copolymer having a molecular weight in the range 10,000 to 300,000. The polymers are useful for preparing fibers and films having improved moisture resistance and tensile modulus.

---

Synthetic fibers, particularly nylon 6 fibers such as those prepared from ε-caprolactam, have found wide commercial acceptance for the manufacture of film, textiles, carpet yarn, bristles and tire cord, among other applications due to their excellent high strength properties and dyeability. However, nylon has certain disadvantageous properties, particularly a sensitivity to moisture. Nylon absorbs about 10% by weight of water at saturation which results in a loss of certain properties, notably a loss in strength, stiffness and tensile modulus. A high tensile modulus is desirable for various applications, e.g., for carpet yarn, to provide good resilience, to prevent permanent deformation or set under pressure and to impart an effect of a deep pile to the finished carpet. When dyed in boiling water, drawn and oriented nylon yarn loses stiffness and the yarn is more difficult to weave into carpet. High water absorption results in a shrinkage or extension of the fiber as relative humidity changes. When constructed into a carpet high humidities may cause it to bulge. Other examples can be cited wherein high stiffness and moisture resistance are advantageous as well. Nylon film for use as packaging material becomes limp when exposed to high humidities and cannot be handled readily by packaging machinery. Toothbrush and paintbrush bristles made from nylon, although noted for their durability and abrasion resistance, lose their resilience and stiffness when saturated with water. The increasing use of water-based latex paints requires brushes of improved water resistance.

Various attempts have been made to overcome nylons' sensitivity to moisture. For example, hydrophobic materials such as glass fibers, have been added to nylon to increase stiffness and tensile strength and decrease water absorption. This route to nylons of higher moisture resistance has been most successful in the case of molding resins where opaqueness is not a disadvantage and the resulting high shear melt flow during processing does not disrupt the uniform distribution of the incompatible hydrophobic phase in the nylon matrix. However, when the nylon must be passed through fine orifices such as during fiber spinning and monofilament extrusion, or when high shear cannot be tolerated, as in film casting, the non-uniform phase distribution limits the utility of these blends.

The grafting of hydrophobic polymers such as polyethylene and polystyrene onto nylon is another route to nylons having improved moisture resistance. Processable graft polymers comprising a nylon and a vinyl aromatic-unsaturated carboxylic acid copolymer wherein the molar ratio of styrene or other monovinyl aromatic monomer is from 0.15 to 0.6 mol per total mols of monovinyl aromatic monomer, lactone and unsaturated acid monomers in the graft polymer, are disclosed by Grillo et al. in U.S. Patent 3,325,561, issued June 13, 1967. These graft polymers are prepared by a process whereby a monovinyl aromatic monomer and an unsaturated carboxylic acid are copolymerized in the presence of lactam monomer at low temperatures and then the temperature is increased to polymerize the lactam and form a graft polymer product. Molded parts of the graft polymer show improved stiffness and water resistance over the corresponding polylactam. However, because of the existence of a dispersion of graft copolymer in a nylon homopolymer matrix of these graft polymers, they have lower clarity than unmodified nylon and the strength of films and fibers prepared from these graft compositions is dependent upon the adhesion between the two phases. Although this adhesion is far superior to other blends known in the prior art, such as blends of nylon 66 and styrene-acrylonitrile copolymer described in U.S. Patent 3,243,478, issued Mar. 29, 1966, oriented films and fibers have low tensile strength in the direction perpendicular to draw, resulting in low tear strength of oriented films and fibrillation of fibers.

Thus it is an object of the present invention to provide nylon compositions having high stiffness and moisture resistance.

It is another object to provide nylon graft compositions having a homogeneous composition which can be formed into films of high clarity and improved tear strength.

It is a further object to provide nylon graft compositions haping a homogeneous composition which can be formed into fibers of improved stiffness, moisture resistance, excellent dyeability, and free of fibrillation.

It is another object to provide a process for the preparation of nylon compositions which can be formed into clear films and fibers having improved stiffness and moisture resistance.

Further objects will become apparent from the following detailed description thereof.

We have discovered that homogeneous nylon graft polymers having improved stiffness and moisture resistance can be prepared by polymerizing a lactam with a copolymer of an olefinic compound and an unsaturated heterocyclic compound having an oxygen or nitrogen atom in the ring under conditions for polymerizing the lactam. The graft compositions of the invention unexpectedly form completely homogeneous compositions resulting in films of high clarity and dyeability. They have improved stiffness and water resistance over unmodified polylactams. Further, oriented films prepared from these compositions have good strengths and tear resistance. Monofilaments can be drawn at high draw ratios to form non-fibrillating fibers having good strength and moisture resistance and tensile modulus which is higher than the unmodified polylactam.

The graft polymers of the invention contain a copolymer of an olefin copolymerized with from 5% to about 70% by weight of an unsaturated heterocyclic compound containing an oxygen or a nitrogen atom in the ring, which provides the grafting sites, as further described hereinafter. Various amounts of the copolymer can be added up to about 30% by weight of the lactam such that the concentration of the unsaturated heterocyclic compound in the graft polymer is from about 0.45% to about 3.5%, preferably from about 0.5% to about 2.5%. It follows therefore, that as the relative amount of the unsaturated heterocyclic compound in the copolymer increases, the amount of copolymer that can be added to the lactam decreases, and thus the properties of the graft polymer will approach that of the unmodified polylactam.

However, utilizing as little as 1–2% of a copolymer containing a large proportion of the unsaturated heterocyclic compound, e.g., about 50% by weight or more, will increase the stiffness of films and fibers over that of the polylactam homopolymer. In general the copolymer is chosen so that from about 5 to about 30% can be added to the lactam. The copolymers useful according to the invention have a molecular weight of at least about 10,000 up to about 300,000, preferably from about 25,000 to about 150,000.

At least about 5% by weight of the olefinic copolymer in the lactam is required to obtain an appreciable improvement in tensile modulus and a decrease in water absorption of the grafted polymer, and preferably the graft composition will contain from about 10% to about 20% by weight of the copolymer. As the copolymer concentration is increased, the graft composition becomes more rubbery in the melt and above about 30% copolymer content, films and fibers formed therefrom become brittle, with poor properties.

The olefinic copolymers suitable for use in the invention are derived from olefins, including aliphatic compounds such as ethylene; halogen-substituted ethylene compounds such as ethylene; halogen-substituted ethyl-compounds such as tetrafluoroethylene, chlorotrifluoroethylene and the like; aromatic compounds such as styrene, alkyl-, halo- or sulfonic acid-substituted styrenes, vinyl toluene and the like; and mixtures of monomers such as styrene and acrylonitrile. Preferably the copolymers are composed of from 75 to 95% by weight of the olefinic compound.

The coreactant is an unsaturated cyclic compound containing an oxygen or nitrogen atom in the ring, which is capable of opening the ring to add on lactam units and recyclizing with the elimination of a simple molecule such as water or ammonia. Suitable coreactants include unsaturated anhydrides, such as maleic anhydride, itaconic anhydride, methacrylic anhydride, citraconic anhydride and the unsaturated analogue of glutaric anhydride; lactones or their hydroxy acid precursors such as the lactone of γ-hydroxycrotonic acid wherein the unsaturation site is within the ring, or the lactone of 4-hydroxy-2-methylene butanoic acid, wherein the unsaturation is outside the ring; and lactams such as the pyrollidone analogues of the lactones. These coreactants provide the sites for the addition of the lactam units. Although the exact mechanism of the reaction is unknown, it is believed to proceed according to the series of equations given below. Equation 1 illustrates polymerization of caprolactam onto a styrene-maleic anhydride copolymer and recyclization with the loss of a water molecule:

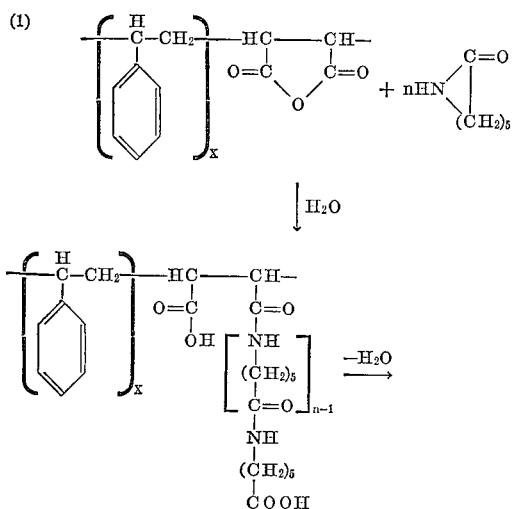

Equation 2 illustrates polymerization of caprolactam onto a styrene-lactone of γ-hydroxycrotonic acid copolymer and recyclization with the loss of a water molecule.

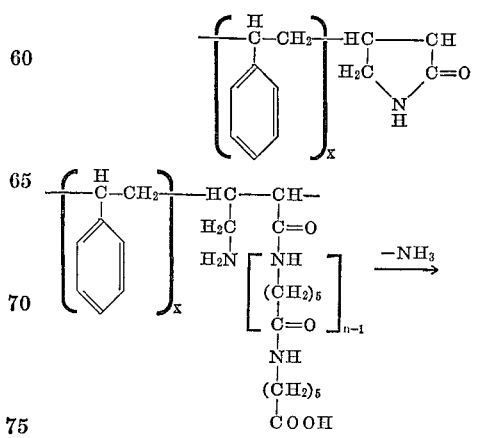

Equation 3 illustrates polymerization of caprolactam onto styrene copolymerized with the pyrollidone analogue of the lactone set forth in Equation 2 and recyclization with the loss of an ammonia molecule:

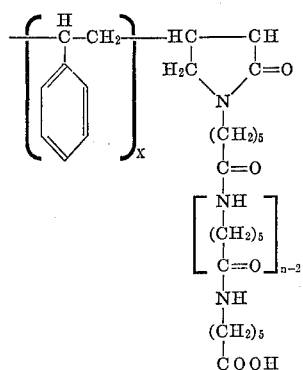

The copolymers as described hereinabove are prepared by the conventional bulk, suspension or emulsion polymerization procedures to molecular weights of up to 300,000.

The lactams suitable for use in the invention are lactams having at least 7 atoms and up to 12 carbon atoms in the ring and include ε-caprolactam, caprylactam, oenantholactam and laurolactam. Mixtures of lactams can also be employed. ε-Caprolactam is particularly preferred.

The graft polymers of the invention are prepared by adding a copolymer as described hereinabove to a molten lactam in the required amounts and stirring until a homogeneous solution is obtained. The lactam solution is then polymerized hydrolytically by well-known methods as by heating to a suitable polymerization temperature, which for ε-caprolactam is generally from about 225° C. to about 280° C. and preferably from about 240° C. to about 260° C., under an inert atmosphere in the presence of a catalyst. Suitable catalysts are well known and include steam, water, ω-aminocaproic acid and the like. The polymerization is continued until the desired molecular weight is obtained. This can be determined by measuring reduced viscosity which can vary from about 0.5 to about 4. For the fabrication of fibers, reduced viscosities of at least 1.0 are generally required. An additional requirement for fibers is a melt viscosity on the order of from 10 to 70 grams of polymer extruded in 10 minutes at 260° C. with an applied weight of 2160 grams, as measured according to ASTM test D-1238-62T for optimum extrudability and fiber properties.

The graft polymers of the invention are homogeneous and are completely soluble in trifluoroethanol, indicating that the graft content is about 100%. Thus films formed from these graft polymers are clear and are eminently suitable for high strength packaging materials. Fibers formed from these graft polymers do not fibrillate under stress, have high strengths and can be dyed uniformly to prepare shades having a minimum variation from one dye lot to another.

This invention will be further illustrated by the examples given below, but it is to be understood that the invention is not meant to be limited to the details disclosed therein. In the examples, all parts are by weight.

The reduced viscosity of the polymers was determined as a 0.52% solution at 25° C. in a solvent, generally metacresol.

Fiber properties were tested according to ASTM test D2101-64T. Compression molding specimens were prepared according to ASTM test D2292-64T. Ultimate elongation and ultimate tensile strength were determined according to ASTM test D1708-59T at a head speed of 0.05 inch per minute. Flexural strength and flexural modulus were determined according to ASTM test D790-66 using ¼" by ½" by 5" bar specimens. Heat distortion temperature was determined according to ASTM test D648-56(1961) at 264 p.s.i. Water absorption was determined according to ASTM test D570-63 using ½" x ¼" x 5" bars immersed in water at 90° C. for 7 days.

EXAMPLE 1

5,587 parts of molten caprolactam, 640 parts of a copolymer consisting of 89% styrene and 11% maleic anhydride having a molecular weight of about 67,000 and 172.8 parts of ω-aminocaproic acid were charged to a stainless steel resin pot. The mixture was heated to 250° C. over a period of 3.5 hours under nitrogen when sufficient water was added to generate 5–10 p.s.i.g. steam pressure. The reaction was continued for about 24 hours. The polymerized material was extruded into an ice water bath, pelletized, and extracted with boiling water to remove monomer and low molecular weight oligomers. The product was dried under vacuum.

The graft polymer had a melt flow of 27 and a reduced viscosity of 2.14. The copolymer content was about 11% after removal of about 10% water extractable material.

The melt was crystal clear, of a slightly yellowish cast with no evidence of rubberiness. The molecular weight was about 700,000 indicating a nylon chain on each maleic anhydride group of a degree of polymerization of 70. The product was completely soluble in trifluoroethanol. A sample of the product was examined under an electron microscope at 57,000 times magnification. Only a single phase was observed; thus, the graft content was about 100%.

A sample of the product was extruded as a monofilament drawn over a hot block at 190° C. to a draw ratio of 4:1 and boiled in water for 70 minutes. Portions of the sample were conditioned at various relative humidities at 23° C., and the physical properties compared to an unmodified polycaprolactam control treated in the same manner. The polylactam had a reduced viscosity of 1.85 corresponding to a molecular weight of about 20,000 and a melt flow of 26. The properties are given below.

| Composition | Ultimate elongation, percent | Ultimate tensile strength, grams/denier | Tensile modulus, grams/denier |
|---|---|---|---|
| 0% relative humidity | | | |
| Graft polymer | 31 | 3.9 | 75 |
| Nylon 6 | 36 | 4.8 | 55 |
| 50% relative humidity | | | |
| Graft polymer | 31 | 3.8 | 52 |
| Nylon 6 | 32 | 4.3 | 29 |
| 93% relative humidity | | | |
| Graft polymer | 28 | 3.2 | 16 |
| Nylon 6 | 36 | 3.9 | 9 |

It is apparent that the tensile modulus of the graft polymer of the invention is higher than unmodified nylon 6.

The properties of molded samples were determined and compared to the nylon 6 control. The results are summarized as follows:

| | Graft polymer | Nylon 6 control |
|---|---|---|
| Ultimate elongation, percent | 70 | 200 |
| Ultimate tensile strength ×10⁻³, p.s.i. | 11.2 | 9.1 |
| 2% secant modulus ×10⁻⁵, p.s.i. | 3.10 | 2.31 |
| Flexural strength ×10⁻⁴, p.s.i. | 1.56 | 1.55 |
| Flexural modulus ×10⁻⁵, p.s.i. | 5.10 | 4.34 |
| Heat distortion temperature, 264 p.s.i., ° C. | 85 | 61 |
| Water absorption, percent | 6.9 | 10 |

Thus, the graft polymer of the invention is stiffer, has a higher heat distortion temperature and lower water absorption than the nylon 6 control.

The electrical properties of a molded sample were determined at 0% and 50% relative humidity, and are summarized below:

|  | Graft polymer | | Nylon 6 control | |
|---|---|---|---|---|
|  | 0% R.H. | 50% R.H. | 0% R.H. | 50% R.H. |
| Dielectric constant: | | | | |
| 60 | 3.61 | (a) | 3.79 | (a) |
| 1 kc | 3.56 | 7.81 | 3.71 | 10.41 |
| 1 mc | 3.30 | 3.77 | 3.38 | 4.07 |
| Dissipation factor: | | | | |
| 60 | .0124 | (a) | .0224 | (a) |
| 1 kc | .0177 | .362 | .0217 | .311 |
| 1 mc | .0164 | .0732 | .0184 | .103 |
| Dielectric strength | 504 | 408 | 433 | 265 | a Beyond bridge range.

The graft polymer is less conductive than nylon 6 and thus is a better insulator.

EXAMPLE 2

Two graft polymers were prepared following the procedure given in Example 1 but increasing the copolymer concentration such that the final concentration of copolymer in the lactam was 16% and 26% respectively. Twenty mil films of these polymers and that of the graft polymer of Example 1 were prepared by compression molding and physical properties determined for the unoriented state as well as after orientation by drawing at 150° C. at a draw ratio of 4:1. Specimens were cut from the drawn film both parallel and perpendicular to the draw direction. The films were conditioned at 50% relative humidity. Comparison was made to films of a nylon control as in Example 1. The results are given below:

| Composition | Ultimate elongation, percent | Ultimate tensile strength, p.s.i. | 2% secant modulus ×10⁻⁵, p.s.i. | Graves tear, lbs./in. | Elmendorf tear, grams |
|---|---|---|---|---|---|
| Unoriented | | | | | |
| 11% copolymer | 330 | 9,600 | 0.91 | 1,320 | >1,600 |
| 16% copolymer | 260 | 9,280 | 1.60 | 1,320 | >1,600 |
| 26% copolymer | 815 | 5,560 | 1.20 | 1,180 | 1,370 |
| Nylon control | 400 | 12,100 | 0.58 | 1,060 | >1,600 |
| Oriented-parallel to draw direction | | | | | |
| 11% copolymer | 42 | 33,300 | 2.70 | 1,715 | 48 |
| 16% copolymer | 20 | 30,400 | 3.86 | 1,380 | 16 |
| Nylon control | 74 | 33,700 | 2.05 | 1,920 | 128 |
| Oriented-perpendicular to draw direction | | | | | |
| 11% copolymer | 80 | 5,180 | 1.84 | 3,460 | 1,400 |
| 16% copolymer | 40 | 5,050 | 1.99 | 3,120 | (1) |
| Nylon control | 175 | 3,940 | 1.37 | 3,650 | >1,600 |

1 Tears in direction of draw.

Thus the graft polymer films are stiffer than those of unmodified polycaprolactam and the tensile strength is higher in the direction perpendicular to draw.

An extruded film of the graft polymer having a density of 1.13 and containing 16% of the copolymer was compared to the nylon control as in Example 1. The tensile modulus was higher in both the machine direction and the transverse direction. The results are given below:

TENSILE MODULUS

|  | Machine direction | Transverse direction |
|---|---|---|
| Nylon 6 control | 100,000 | 115,000 |
| 16% copolymer | 181,000 | 175,000 |

The water vapor transmission (g./100 in.²/24 hr.) for the nylon control was 19.5 and was only 12.4 for the graft polymer.

EXAMPLE 3

640 parts of 85:15 styrene-maleic anhydride copolymer having a molecular weight of 29,000, 5,587 parts of molten caprolactam and 173 parts of ω-aminocaproic acid were charged to a resin pot and polymerized as in Example 1.

The graft polymer product was extracted with water and contained 11% of the copolymer. The product had a melt flow of 24 and a reduced viscosity of 2.96.

A portion of the product was extruded into a monofilament and drawn at 190° C. to a draw ratio of 4:1. The monofilament was immersed in boiling water for 70 minutes and conditioned at various relative humidities. The following physical properites were determined and compared to a nylon 6 control as in Example 1. The tests were run at 23° C.

| Composition | Ultimate elongation, percent | Ultimate tensile strength, grams/denier | Tensile modulus, grams/denier |
|---|---|---|---|
| 0% relative humidity | | | |
| Graft polymer | 21 | 2.6 | 63 |
| Nylon 6 | 36 | 4.8 | 55 |
| 50% relative humidity | | | |
| Graft polymer | 20 | 2.7 | 41 |
| Nylon 6 | 32 | 4.3 | 29 |
| 93% relative humidity | | | |
| Graft polymer | 19 | 2.1 | 19 |
| Nylon 6 | 36 | 3.9 | 6 |

20 mil films were compression molded and drawn at 150° C. to a draw ratio of 4:1. The physical properties are given below and compared to a nylon 6 control.

| Composition | Ultimate elongation, percent | Ultimate tensile strength, p.s.i. | 2% secant modulus ×10⁻⁵, p.s.i. | Graves tear, lbs./in. | Elmendorf tear, grams |
|---|---|---|---|---|---|
| Unoriented | | | | | |
| Graft polymer | 300 | 8,920 | 1.06 | 1,320 | >1,600 |
| Nylon 6 | 400 | 12,100 | 0.58 | 1,060 | >1,600 |
| Parallel to draw direction | | | | | |
| Graft polymer | 30 | 35,100 | 3.53 | 1,620 | 32 |
| Nylon 6 | 74 | 33,700 | 2.05 | 1,920 | 128 |
| Perpendicular to draw direction | | | | | |
| Graft polymer | 120 | 5,410 | 1.86 | 3,650 | 1,230 |
| Nylon 6 | 175 | 3,940 | 1.37 | 3,650 | >1,600 |

The graft polymer monofilament was dyed in a mixed basic red and acid blue dye bath according to the following procedure: 0.1974 part of the fiber was coiled around a glass spiral and placed in a breaker. 7.9 ml. of prescouring solution containing 2% by weight of the fiber of trisodium phosphate and 0.5% by weight of the fiber of Triton X–100, an alkyl aryl polyether alcohol obtained from Rohm and Haas Co. was added to the beaker and heated for 30 minutes at 60° C. The solution was poured off, the sample rinsed with water and 7.9 ml. of Alkanol CN, a surface active agent obtained from E. I. du Pont de Nemours & Co. buffered to pH 6.3 with equal parts of monosodium phosphate and disodium phosphate was added. The fiber was allowed to remain in this solution for ten minutes at room temperature when 0.4 ml. of a 0.1% solution of Sevron Red L, a basic dye supplied by E. I. du Pont de Nemours & Co. was added. The solution was stirred for five minutes and 0.40 ml. of 1% Sulfomine Acid Blue R, a dye supplied by Sandoz, Inc. solution was added. The solution was heated to boiling over a 45 minute period and boiled for one hour, adding water as required to main a constant volume.

The fiber was drained, rinsed with water and dried overnight in air. The fiber had a reddish-orange color, corresponding most closely to color No. 7 of the Color Index Hue Indicator Chart. Thus the compositions of the inevntion pick up basic, rather than acid dyes. A nylon 6 monofilament dyed in similar manner had a blue-purple color, indicating pick up of the acid dye.

The dyed graft polymer fiber was submitted for Fadeometer testing. After 20 hours of exposure, the sample had a grey scale rating of 4–5, indicating excellent stability to light.

EXAMPLE 4

5,587 Parts of caprolactam, 640 parts of a 75:25 styrene: maleic anhydride copolymer having a molecular weight of 138,000 and 173 parts of ω-aminocaproic acid were charged to a resin pot and polymerized as in Example 1. The product was extracted with water. The copolymer content was 11%.

The product had a melt index of 31 and a reduced viscosity of 3.1.

The graft polymer was extruded as a monofilament and drawn in oil at 165° C. to a draw ratio of 4:1. The monofilament was immersed in boiling water for 70 minutes and conditioned at various relative humidities. The fiber properties are given below, compared to a nylon 6 control.

| Composition | Ultimate elongation, percent | Ultimate tensile strength, grams/denier | Tensile modulus, grams/denier |
|---|---|---|---|
| 0% relative humidity ||||
| Graft polymer | 25 | 2.9 | 66 |
| Nylon 6 | 36 | 4.8 | 55 |
| 50% relative humidity ||||
| Graft polymer | 25 | 2.6 | 44 |
| Nylon 6 | 32 | 4.3 | 29 |
| 93% relative humidity ||||
| Graft polymer | 23 | 2.3 | 23 |
| Nylon 6 | 36 | 3.9 | 9 |

20 mil films were compression molded and drawn at 150° C. to a draw ratio of 4:1. The physical properties are given below and compared to a nylon 6 control.

| Composition | Ultimate elongation, percent | Ultimate tensile strength, p.s.i. | 2% secant modulus ×10⁻⁵, p.s.i. | Graves tear, lbs./in. | Elmendorf tear, grams |
|---|---|---|---|---|---|
| Unoriented ||||||
| Graft polymer | 300 | 8,370 | 0.94 | 1,100 | 1,400 |
| Nylon 6 | 400 | 12,100 | 0.58 | 1,060 | >1,600 |
| Oriented-parallel to draw direction ||||||
| Graft polymer | 30 | 23,500 | 2.46 | 1,100 | |
| Nylon 6 | 74 | 33,700 | 2.05 | 1,920 | 128 |

EXAMPLE 5

5,587 parts of caprolactam, 640 parts of 92:8 styrene: maleic anhydride copolymer having a molecular weight of 170,000 and 173 parts of ω-aminocaproic acid were charged to a resin pot and polymerized as in Example 1. The product was extracted with water. The copolymer content was 11%.

The product had a melt index of 5 and a reduced viscosity of 2.87.

Compression molded specimens were formed and the properties determined. They are summarized below:

| | Graft polymer | Nylon 6 control |
|---|---|---|
| Ultimate elongation, percent | 4 | 200 |
| Ultimate tensile strength ×10⁻³, p.s.i. | 10.0 | 9.1 |
| 2% secant modulus ×10⁻⁵, p.s.i. | 2.53 | 2.31 |
| Flexural strength ×10⁻⁴, p.s.i. | 1.17 | 1.55 |
| Flexural modulus ×10⁻⁵, p.s.i. | 4.80 | 4.34 |
| Heat distortion temperature 264 p.s.i., ° C | 77 | 61 |
| Water absorption, percent | 7.4 | 10 |

20 mil films were compression molded and physical properties determined on unoriented and oriented films drawn at 150° C. to a draw ratio of 4:1.

They are summarized below compared to nylon 6 control.

| Composition | Ultimate elongation, percent | Ultimate tensile strength, p.s.i. | 2% secant modulus ×10⁻⁵, p.s.i. | Graves tear, lbs./in. | Elmendorf tear, grams |
|---|---|---|---|---|---|
| Unoriented ||||||
| Graft polymer | 330 | 9,800 | 0.98 | 1,180 | >1,600 |
| Nylon 6 | 400 | 12,100 | 0.58 | 1,060 | >1,600 |
| Oriented-parallel to draw direction ||||||
| Graft polymer | 30 | 32,430 | 2.91 | 1,710 | 64 |
| Nylon 6 | 74 | 33,700 | 2.05 | 1,920 | 128 |
| Oriented-perpendicular to draw direction ||||||
| Graft polymer | 60 | 4,990 | 1.57 | 3,110 | >1,600 |
| Nylon 6 | 175 | 3,940 | 1.37 | 3,650 | >1,600 |

EXAMPLE 6

5,587 parts of caprolactam, 640 parts of a 95:5 styrene; maleic anhydride copolymer having a molecular weight of 136,000 and 173 parts of ω-aminocaproic acid were charged to a resin pot and polymerized as in Example 1. The product was extracted with boiling water and had a copolymer content of 11%.

The product had a melt flow of 18 and a reduced viscosity of 2.37.

A monofilament was extruded, drawn and conditioned as in Example 3. The test results are given below:

| Composition | Ultimate elongation, percent | Ultimate tensile strength, grams/denier | Tensile modulus, grams/denier |
|---|---|---|---|
| *0% relative humidity* | | | |
| Graft polymer | 36 | 3.8 | 52 |
| Nylon 6 | 36 | 4.8 | 55 |
| *50% relative humidity* | | | |
| Graft polymer | 37 | 3.7 | 31 |
| Nylon 6 | 32 | 4.3 | 19 |
| *93% relative humidity* | | | |
| Graft polymer | 38 | 3.3 | 15 |
| Nylon 6 | 36 | 3.9 | 9 |

Film properties of 20 mil films were tested as in Example 3. The results are given below compared to a nylon 6 control.

The polymer was compression molded to a 20 mil film and drawn at 150° C. at a draw ratio of 4:1. Physical properties were determined and compared to a nylon 6 control as set forth below:

| Composition | Ultimate elongation, percent | Ultimate tensile strength, p.s.i. | 2% secant modulus ×10⁻⁵, p.s.i. | Graves tear, lbs./in. | Elmendorf tear, grams |
|---|---|---|---|---|---|
| *Unoriented* | | | | | |
| Graft polymer | 330 | 10,600 | 0.80 | 1,400 | >1,600 |
| Nylon 6 | 400 | 12,100 | 0.58 | 1,060 | >1,600 |
| *Oriented-parallel to draw direction* | | | | | |
| Graft polymer | 39 | 35,050 | 2.57 | 1,770 | 144 |
| Nylon 6 | 74 | 33,700 | 2.05 | 1,920 | 128 |
| *Oriented-perpendicular to draw direction* | | | | | |
| Graft polymer | 190 | 4,720 | 1.59 | 4,070 | >1,600 |
| Nylon 6 | 175 | 3,940 | 1.37 | 3,650 | >1,600 |

EXAMPLE 9

This example is given to illustrate the diffrences between the graft polymers of the invention and the non-homogeneous polymers obtained according to the Grillo et al. patent, supra.

A graft polymer of nylon 6 and a copolymer of styrene and methacrylic acid prepared according to Example 6 of the Grillo et al. patent was compression molded to a film and drawn at 150° C. to a draw ratio of 4:1. The film was milky and hazy in appearance.

The film was examined under a microscope at a magnification of 1110 times. White particles of polystyrene in a nylon 6 matrix were noted having a size of from about 0.3 to about 2 microns.

The polymer was compression molded to a 20 mil film at 150° C. and drawn at a draw ratio of 4:1. The properties are given below:

| | Parallel to draw direction | Perpendicular to draw direction |
|---|---|---|
| Ultimate elongation, percent | 30 | 10 |
| Ultimate tensile strength, p.s.i. | 24,300 | 4,800 |
| 2% secant modulus ×10⁻⁵, p.s.i. | 3.34 | 1.90 |
| Graves tear, lbs./in. | 290 | 1,880 |
| Elmendorf tear, grams | 48 | (¹) |

¹ Tears in draw direction.

| Composition | Ultimate elongation, percent | Ultimate tensile strength, p.s.i. | 2% secant modulus ×10⁻⁵, p.s.i. | Graves tear, lbs./in. | Elmendorf tear, grams |
|---|---|---|---|---|---|
| *Unoriented* | | | | | |
| Graft polymer | 340 | 9,980 | 1.08 | 1,470 | >1,600 |
| Nylon 6 | 400 | 12,100 | 0.58 | 1,060 | >1,600 |
| *Oriented-parallel to draw direction* | | | | | |
| Graft polymer | 50 | 33,120 | 3.10 | 1,960 | 64 |
| Nylon 6 | 74 | 33,700 | 2.05 | 1,920 | 128 |
| *Oriented-perpendicular to draw direction* | | | | | |
| Graft polymer | 100 | 5,070 | 1.69 | 4,140 | >1,600 |
| Nylon 6 | 175 | 3,940 | 1.37 | 3,650 | >1,600 |

EXAMPLE 7

5,587 parts of caprolactam, 640 parts of a 31:69 ethylene:maleic anhydride copolymer having a molecular weight of 34,400 and 173 parts of ω-aminocaproic acid were charged to a resin pot and polymerized as in Example 1. The polymer was extracted with boiling water and had a copolymer content of 11%.

The product was a clear melt, indicating a homogeneous composition. The melting point was about 215° C. Infared analysis indicated a cyclic imide structure.

EXAMPLE 8

6,115 parts of caprolactam, 96 parts of a 31:69 ethylene:maleic anhydride copolymer having a molecular weight of 34,400 and 189 parts of ω-aminocaproic acid were polymerized as in Example 1. The product was extracted with water. The copolymer content was 1.5%.

The product had a melt index of 18 and a reduced viscosity of 2.69.

A comparison of these properties with those of the graft polymers of the present invention shows that the prior art polymers are stiffer then nylon 6, but have greatly inferior tear strengths both parallel and perpendicular to the draw direction.

It will be apparent that numerous modifications and variations may be effected without departing from the novel concepts of the present invention and the illustrative details disclosed are not to be construed as imposing undue limitations on the invention.

We claim:

1. A homogeneous graft polymer having carboxy terminated side chains of a lactam having from 7 atoms up to 12 carbon atoms in the ring and a copolymer of an olefin selected from the group consisting of ethylene, halogen-substituted ethylene compounds, styrene, alkyl-, halo- or sulfonic acid-substituted styrenes, vinyl toluene and mixtures of styrene and acrylonitrile and from 5 to 70% by weight of an unsaturated heterocyclic compound containing an oxygen or a nitrogen atom in the ring selected from the group consisting of unsaturated anhydrides and lactones, their hydroxy acid precursors and their lactam analogs in an amount so that the concentration of said unsaturated heterocyclic compound in the graft polymer is from about 0.45% to about 3.5%, said copolymer having a molecular weight of from about 10,000 to about 300,000.

2. A graft polymer according to claim 1 wherein said unsaturated heterocyclic compound is maleic anhydride and its concentration in the graft polymer is from about 0.55% to about 2.9% by weight.

3. A graft polymer according to claim 1 wherein said copolymer is prepared from an olefin selected from the group consisting of styrene, alkyl-substituted styrene, halogen-substituted styrene and ethylene.

4. A graft polymer according to claim 3 wherein said unsaturated heterocyclic compound is maleic anhydride.

5. A graft polymer according to claim 1 wherein said lactam is ε-caprolactam.

6. A graft polymer according to claim 3 wherein said lactam is ε-caprolactam.

7. A moisture resistant nonfibrillating fiber formed from the composition of claim 1.

8. A clear film formed from the composition of claim 1.

9. A process for the preparation of homogeneous graft polymers having carboxy terminated side chains which comprises dissolving in a molten lactam having from 7 atoms up to 12 carbon atoms in the ring a coplymer of an olefin selected from the group consisting of ethylene, halogen substituted ethylene compounds, styrene, alkyl-, halo- or sulfonic acid-substituted styrene, vinyl toluene and mixtures of styrene and acrylonitrile and from 5 to 70% by weight of an unsaturated heterocyclic compound selected from the group consisting of unsaturated anhydrides, lactones, hydroxy acid precursors of said lactones and lactam analogs of said lactones in an amount so that the concentration of said unsaturated heterocyclic compound in the solution is from about 0.45% to about 3.5% by weight, said copolymer having a molecular weight of from about 10,000 to about 300,000 and hydrolytically polymerizing the lactam.

10. A process according to claim 9 wherein said lactam is ε-caprolactam.

11. A process according to claim 9 wherein said unsaturated heterocyclic compound is maleic anhydride.

12. A process for the preparation of a homogeneous graft copolymer having carboxy terminated side chains of nonfibrillating fibers having improved stiffness and moisture resistance and dyeable with a basic dye which comprises dissolving in a molten ε-caprolactam having from 7 atoms up to 12 carbon atoms in the ring a copolymer of an olefin selected from the group consisting of ethylene, halogen substituted ethylene compounds, styrene, alkyl-, halo- or sulfonic acid-substituted styrenes, vinyl toluene and mixtures of styrene and acrylonitrile and from 5 to 70% by weight of an unsaturated heterocyclic compound selected from the group consisting of unsaturated anhydrides, lactones, hydroxyacid precursors of said lactones and lactam analogs of said lactones in an amount so that the concentration of said unsaturated heterocyclic compound in the solution is from about 0.45% to about 3.5% by weight, said copolymer having a molecular weight of from about 10,000 to about 300,000, hydrolytically polymerizing the ε-caprolactam to a polymer having a reduced viscosity of at least 1, forming a monofilament from the resultant graft polymer and drawing the monofilament to a draw ratio of at least about 4:1.

13. A process according to claim 12 wherein said copolymer is derived from styrene and maleic anhydride and has a molecular weight of from about 25,000 to about 150,000.

14. A process for the preparation of clear films having improved moisture resistance which comprises dissolving in molten ε-caprolactam having from 7 atoms up to 12 carbon atoms in the ring a copolymer of an olefin selected from the group consisting of ethylene, halogen-substituted ethylene compounds, styrene, alkyl-, halo- or sulfonic acid-substituted styrenes, vinyl toluene and mixtures of styrene and acrylonitrile and from 5 to 70% by weight of an unsaturated heterocyclic compound selected from the group consisting of unsaturated anhydrides, lactones, hydroxyacid precursors of said lactones and lactam analogs of said lactones in an amount so that the concentration of said unsaturated heterocyclic compound in the solution is from about 0.45% to about 3.5% by weight, said copolymer having a molecular weight of from about 10,000 to about 300,000, hydrolytically polymerizing the ε-caprolactam to a polymer having a reduced viscosity of at least 0.5, and forming the resultant graft polymer to a film.

15. A process according to claim 14 wherein said copolymer is derived from styrene and maleic anhydride and has a molecular weight of from about 25,000 to about 150,000.

References Cited

UNITED STATES PATENTS

| | | | |
|---|---|---|---|
| 3,136,738 | 6/1964 | Hedrick | 260—857 |
| 3,243,476 | 3/1966 | Black | 260—857 |
| 3,243,477 | 3/1966 | Black | 260—857 |
| 3,325,561 | 6/1967 | Grillo | 260—857 |
| 3,388,186 | 6/1968 | Kray | 260—857 |
| 3,465,059 | 9/1969 | Seven | 260—857 |

PAUL LIEBERMAN, Primary Examiner

U.S. Cl. X.R.

260—78, 78.3, 78.5